United States Patent Office.

LEWIS FRANCIS, OF NEW YORK, N. Y., ASSIGNOR TO W. O. HICKOK, OF HARRISBURG, PENNSYLVANIA.

Letters Patent No. 72,621, dated December 24, 1867.

IMPROVED INK FOR PAPER-RULING.

*The Schedule referred to in these Letters Patent and making part of the same.*

TO ALL WHOM IT MAY CONCERN:

Be it known that I, LEWIS FRANCIS, of the city, county, and State of New York, have invented, made, and applied to use certain Improvements in the Manufacture of Inks for Machine-Ruling; and I do declare the following to be a full, clear, and correct description of the same.

The nature of my invention consists in making inks of various colors for ruling paper, by combining acetic acid, or its equivalent, with aniline.

To enable those skilled in the arts to make and use my invention, I will proceed to describe the mode of making the same.

I take one ounce of aniline, and dissolve it in twelve ounce of hot acetic acid, then add water enough to give it the proper color, say from three to six gallons of water to each ounce of aniline.

After the ruling-ink is thus made, it is to be treated precisely as ruling-ink has been treated heretofore, the treatment of which is familiar to any machine-ruler.

In some cases, I combine with the acid aniline crystals of different colors, when it may be necessary to do so to form a desired color.

The fluid thus formed will be found to possess a brighter and more lasting color than that in common use, to flow more freely, and to be more readily and rapidly prepared for use, that is to say, adapted to the quality of the paper to be ruled.

Having thus described my invention, what I claim as new, and desire to secure by Letters Patent, is—

Making machine-ruling ink, substantially as herein described.

LEWIS FRANCIS.

Witnesses:
A. SIDNEY DOANE,
GEO. T. GORDON.